Figure 1:
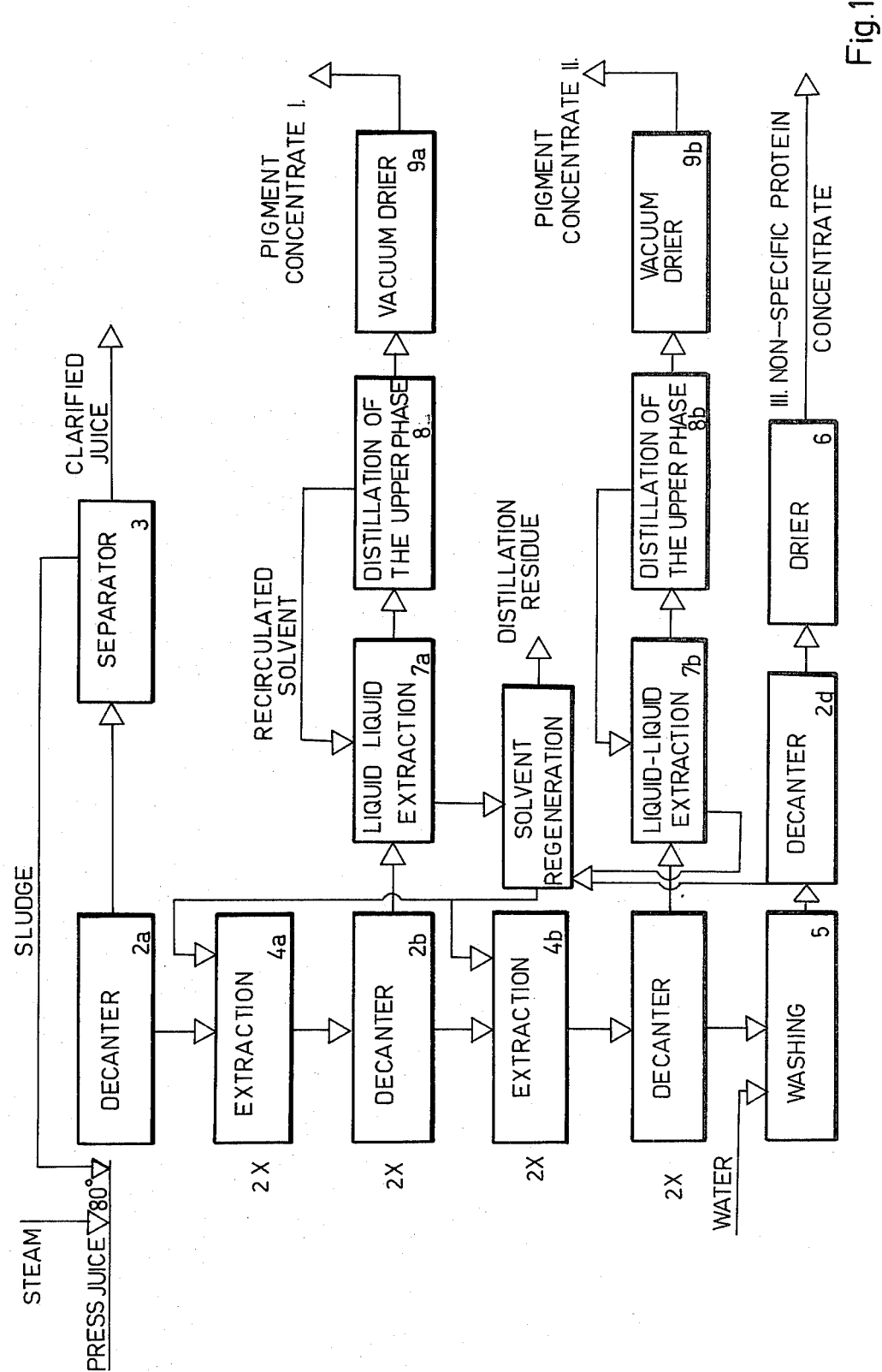

United States Patent [19]

Koch

[11] 4,233,210
[45] Nov. 11, 1980

[54] PROCESS FOR PREPARING NON-SPECIFIC PROTEIN CONCENTRATE AND OF OTHER FODDER ADDITIVES HAVING A BIOLOGICAL ACTIVITY

[75] Inventor: Lehel Koch, Budapest, Hungary

[73] Assignee: Vepex Fövallalkozasi Iroda Rt, Tatabanya, Hungary

[21] Appl. No.: 974,022

[22] Filed: Dec. 28, 1978

Related U.S. Application Data

[63] Continuation of Ser. No. 786,822, Apr. 12, 1977, abandoned.

[30] Foreign Application Priority Data

Jun. 30, 1976 [HU] Hungary .................... LI 296

[51] Int. Cl.³ .......................................... A23J 1/14
[52] U.S. Cl. ................... 260/112 R; 426/429; 426/489; 426/495; 426/520; 426/635; 426/636; 426/656

[58] Field of Search ............... 426/635, 636, 656, 655, 426/425, 429, 430, 431, 436, 478, 489, 490, 495, 540, 520; 260/666 C, 112 R

[56] References Cited

U.S. PATENT DOCUMENTS

| 2,032,165 | 2/1936 | Barnett et al. | 260/666 C |
| 2,394,278 | 2/1946 | Wall et al. | 260/666 C |
| 3,684,520 | 8/1972 | Bickoff et al. | 426/270 |
| 3,823,128 | 7/1974 | Bickoff et al. | 426/655 |

Primary Examiner—R. B. Penland

[57] ABSTRACT

The present invention provides for isolated non-specific plant concentrates and other fodder additives and a process for their manufacture comprising precipitating a protein fraction from plant juices by coagulation and treating the coagulated green protein fraction with glycol or diglycol ether thereby isolating the valuable substances therefrom. The obtained concentrates are useful as animal fodder and in human nourishment.

4 Claims, 3 Drawing Figures

PROCESS FOR PREPARING NON-SPECIFIC PROTEIN CONCENTRATE AND OF OTHER FODDER ADDITIVES HAVING A BIOLOGICAL ACTIVITY

CROSS-REFERENCE TO RELATED APPLICATION

This is a continuation of U.S. Ser. No. 786,822 of Apr. 12, 1977 which application is now abandoned.

The invention relates to a process for preparing non-specific protein concentrates and other Fodder additives having biological activity out of pressed juice of green plant and out of the obtained pressed cake.

The utilization of the nutritive components and protein produced by green plants has gained increasing importance in order to satisfy the nutritive substance and protein loss existing in animal foddering and in human nourishment. A broader industrial utilization of fibrous or fibre-free nutritive substances and protein fractions prepared from green leafy material is restricted due to difficulties is separation from other substances. Thus, in contrast to the common soya, fishmeal and other protein sources, the protein is available in plants in the vegetative state only and accompanied by several other substances. The kind of accompanying substances influences the quality and biological value of the obtained protein; that is, the protein obtained from the green plants cannot be considered identical to, as far as utility, the common protein and nutritive substance although the plant protein has a very advantageous composition. The prevailing protein demand that the composition thereof depends on whether it will be used for human consumption or foddering of animals. In animal foddering the demand can be further divided because the quality of composition of the fodder is variable depending on the demands of the animals.

The technical methods directed to the processing of leafy proteins are rather developed but only in a very limited commercial scope. The removal of the accompanying substances from the leafy protein to obtain a certain protein concentration is very complicated to carry out in an economical way and constitutes a very difficult technical problem.

In addition to the preparation of leaf protein concentrates substantially free from accompanying substances there is a very important task to isolate the pro-vitamin growth factors and pigment substances preserved in a natural state and obtain these components of the crude plant in a concentrated form.

A series of experimental work has been done to purify the chloroplastic and cytoplasmic protein fractions which are separable from plant juice prepared by pressing of green leafy substance. In spite of these efforts no economical method could be elaborated relating to the fractioning of the protein curd obtained under heat treatment of plant juices and the separation of the disadvantageous accompanying substances. The removal of accompanying substances generally requires many steps and a decomposition of the natural protein values cannot be avoided. In addition the isolation of the substances can be carried out only to a certain extent. A further difficulty is caused by the fact that a part of the accompanying substances is lipid-soluble; that is, the removal thereof can be only effected by means of an apolar solvent. The water soluble accompanying substances on the other hand can be removed only by means of a polar solvent. The accompanying substances, e.g. chlorophyll and its derivatives and the decomposition products thereof, are from a biological point of view not detrimental. In course of the treatment, however, such decomposition products are formed or enriched in the end-product which may cause damages on utilizing the obtained protein concentrate as a fodder. Among the accompanying substances the triterpenes and steroidal saponines can be mentioned which are toxic compounds owing to their haemolytic effect. The presence of phenolic compounds and tannic acid is disadvantageous on utilizing the protein concentrate because these substances inhibit enzymes having an important biological role and, in addition, they can cause the coagulation of the protein. Among the noxious accompanying substances the nitrates are of significance, the removal thereof is absolutely necessary at least to such an extent that the presence thereof does not hinder the use of leaf proteins in animal foddering.

It is well known that from the protein fraction obtainable from plant juices the cytoplasmic (white) protein fraction is more advantageous for, following the isolation of the chloroplastic fraction, the cytoplasmic fraction contains only very small amounts of accompanying substances and it can be considered as a non-specific concentrate useful also human nourishment.

In the present invention those protein fractions are considered non-specific which have a raw protein content of higher than 60 weight % and contain secondary metabolite products and specific components only in an unnoxious quantity which are characteristic of crude material. The composition of the non-specific protein fraction can be characterized essentially consisting of proteins, carbohydrates and mineral substances. The method directed to the separation of the two protein fractions was only partly successful as a certain increase of the obtainable ratio of cytoplasmic protein fraction can be attained through improving the fractionation of the two protein fractions or by means of using auxiliary substances. The major part of the leaf protein, however, contained in the chloroplast fraction and the transformation thereof into non-specific protein fraction or the isolation thereof in such a form constitutes an unsolved problem according to the state of art.

An object of the present invention is the processing of leaf protein curds into non-specific stable protein concentrates which are practically free of the major part of the pigments and accompanying substances characterizing the plants and in this form can be utilized in animal foddering without special limitation.

Another object of the present invention is the fractionated processing of the separated pigment and accompanying substances from the protein curd into a fodder additive which in itself or mixed with stabilizers or carriers and other nourishing substances respectively, may constitute an important component on foddering of animals.

Further objects of the present invention are illustrated in the specification below.

The process of the invention for preparing a non-specific plant (leaf protein) concentrate and other fodder additives having a biological activity comprises precipitating a protein fraction from plant juices under the action of heat by coagulating and working up the pressed cake obtained via pressing of the raw plant material; treating the obtained coagulated green protein fraction containing at least 1.5–2 times more water than its dry weight with at least 5 times more glycol ether or diglycol ether than its dry weight, this solvent may contain methanol as well; drying the treated protein fraction after washing it with water, and separating the valuable substances dissolved from the glycol ether phase and further mixing said materials to the pressed cake, regenerating the solvent and recirculating it into the treatment.

According to the invention a protein curd obtained via heat coagulation of the protein at a temperature of 80° to 85° C. containing both chloroplastic and cytoplasmic protein fraction is processed. The protein fraction to be processed may contain only the chloroplastic fraction which is coagulated from a pressed juice until 55° to 60° C. On separating the protein fraction in certain cases it is advantageous to use surface active substances which make the precipitation and the separation of the protein fraction and precipitate easier. As a surface active agent a substance can be selected which has an HLB-value (Hydrophilic-Lipoid-Balance) in the range of 8 to 18 or a mixture of such surface active substances which are used in a quantity of about 2400—to 6000 ppm calculated on the dry matter weight of the plant juice.

The glycolether or diglycolether is a member of the group selected from ethyleneglycol monomethylether, ethyleneglycol monoethylether, ethyleneglycol propylether, diethyleneglycol monomethylether and diethyleneglycol monomethylether. These solvents are generally referred as Cellosolve or Carbitol solvents. The treatment with the glycolethers can be effected stepwise or continuously. A treatment of the protein fraction in four steps proved especially preferable because in such cases there is a possibility to isolate the accompanying substances in a fractionated way. The solvent (extract) phase separated in the first two steps can be worked up to xanthophyll whereas the solvent (extract) phase separated in the further steps to carotenoids.

According to our experience a treatment of the green protein curd with a mixture of a glycolether and methanol constitutes a highly preferable embodiment of the invention. The ratio of the glycolether and methanol is adjusted between the limits of 3:1 to 2:1.

On processing the solvent (extract) phase with another solvent non-miscible with the first solvent actually a liquid-liquid extraction is carried out. The second solvent used in this extraction is an apolar one preferably a benzene in the boiling point range of 80° to 100° C. On treating the glycolether solvent phase with benzene a major part of the pigments and of the lipids can be removed from the glycolether phase and on processing the benzene phase after distilling off the benzene the pigment and lipids can be separated from the residue. However, without using a second solvent and a liquid-liquid extraction there is a possibility to utilize the accompanying substances and pigments obtained from the glycolether phase if the distillation residue obtained after the removal of the first solvent is mixed with the fibrous press cake and thus the fodder value thereof is essentially improved.

The accompanying substances—as already described—may be utilized per se, mixed with other nourishing components or with carriers.

The scope of the invention extends to the products obtained as a result of the methods described. The non-specific plant (leafy) protein concentrates contains 65–75% by weight crude protein practically free from chlorophyll, carotenoids, xanthophyll and the decomposition products thereof, 4% by weight of mineral substances, up to 1.5% by weight of raw fibre, 14 to 22% by weight of nitrogen free extract, 0.8 to 1.0% by weight lipids and about 6% by weight humidity. The non-specific plant protein concentrates may be mixed with other protein components for texturising purposes and especially preferable in animal foddering.

The xanthophyll concentrate contains about 3% by weight xanthophyll, about 0.5 weight % of beta-carotene, about 3 weight % water and the rest lipids. This concentrate can be preferably used in chicken-farming.

The beta-carotene concentrates contain 0.8 weight % of beta-carotene, up to 0.5 weight % xanthophyll about 3 weight % water and in the rest lipids.

The fodder flour or granulate prepared according to the invention consists of the press cake of green plant and of extracted lipids and can be characterized by containing about 35 weight % of crude fibre, 10 to 15 weight % of crude protein, 10 to 14 weight % of mineral substances, 2 to 3 weight % of crude fat, 25 to 30 weight % nitrogen free extract, finally 30 mg/kg of beta-carotene and 40 to 60 mg/kg of xanthophyll.

The plant pigment concentrates may contain xanthophyll, cartenoids, chlorophyll and lipids separately or mixed with one another. The selected separation of the two types of carotenoid pigments is also possible according to the present invention.

The process of the present invention enables the transformation of leaf protein curd isolated from press juices into a stable, non-specific protein concentrate, which contains secondary metabolite products only in a non toxic quantity. As a result of the treatment with glycolether the majority of lipoid-soluble and water-soluble accompanying substances can be removed and at the same time the decomposition and enrichment of the chlorophylls and the derivatives thereof can be avoided. The importance of the glycolether treatment is that, this solvent exerts a selective solubility action to the carotenoids and xanthophyll depending on the water content of the protein curd and this recognition can be utilized to process and isolate each pigment substance separately. The protein concentrate does not contain the characteristic ingredients and properties of the plant processed and the necessity of separating the chloroplastic and cytoplasmic protein fractions or the necessity of increasing the ratio of the cytoplasmic fraction can be eliminated. Thus both protein fractions and their analogous amine acid composition can be utilized free from the accompanying substances. The possibility of the selective processing of the pigment substances represents an additional advantage, which could not be foreseen.

The process is illustrated with reference to the attached Figures.

According to FIG. 1 the press juice obtained from green plants is heated to 80° C. and a green protein curd is separated in decanter 2a, the effluent liquid from the decanter is conducted to the self-discharging separator and the obtained dilute sludge is recirculated into decanter 2a, the separated pressed juice can be subjected to an optional further processing.

The green protein curd separated in decanter 2a is extracted twice in extractor 4a with fresh or regenerated solvent, between the extraction steps there is always a separation carried out in decanter 2b. After the second separation effected in decanter 2b the liquid obtained from the two extraction steps is treated with an apolar solvent in pigment extractor 7a. The lower phase of the extraction is distilled in apparatus 8 and the residue of the distillation is dried in vacuum drier 9a. The upper phase of the extraction liquid is regenerated and the solvent recirculated to 4a. The isolated pigment concentrate I contains mainly xanthophyll. The twice extracted protein curd in decanter 2b is extracted again twice in extractor 4b. The liquid phase obtained in extractor 7b is subjected to a liquid-liquid extraction with an apolar solvent, thereafter in distillation apparatus 8b the apolar solvent is regenerated and the obtained pigment concentrate II is vacuum-dried at 9b. The pigment concentrate II contains in addition to liquids mainly carotenes.

The four times treated protein curd is washed in apparatus 5 generally by means of suspending it in water, thereafter decanting it in decanter 2d. The product is dried in apparatus 6. The obtained non-specific protein concentrate III can be utilized due to its composition both for animal fodder and for human consumption.

Figure 2:
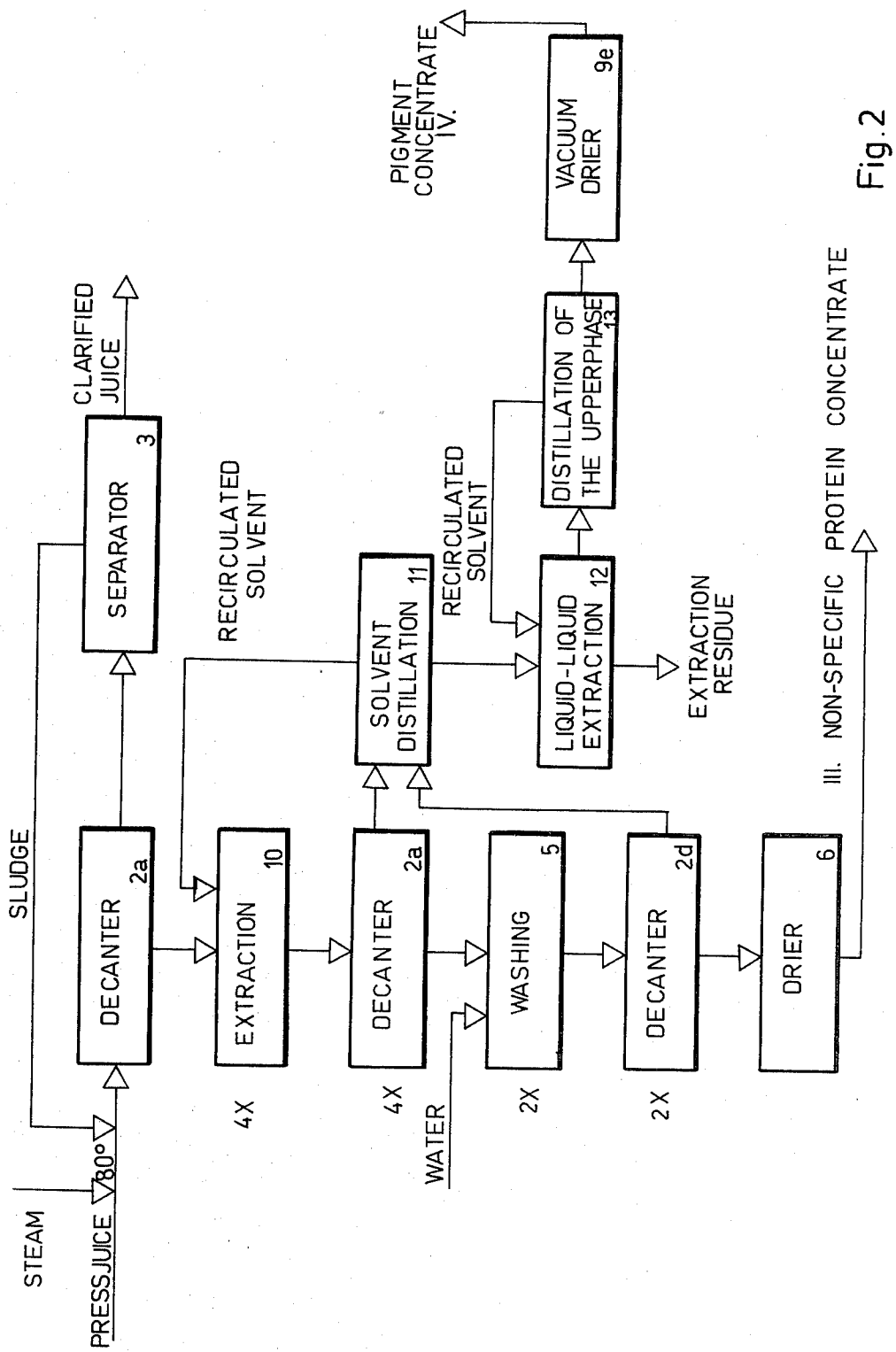

On FIG. 2 a similar processing as in FIG. 1 is illustrated with the difference that the treatment of the green protein curd is repeated four times always after intermediate decanting in apparatus 10. The obtained extract phase is distilled in apparatus 11 and in apparatus 12 the liquid phase is subjected to a liquid-liquid extraction with an apolar solvent. The upper phase of the extraction is distilled in apparatus 13 and the united pigment concentrate IV is dried in vacuo in drier 9c. The separated protein curd from decanter 2e is conducted to the washing apparatus 5 where it is washed twice with water, the water suspension is separated twice in decanter 2d thereafter the protein curd is dried in drier 6 obtained thus a non-specific protein concentrate III.

Figure 3:
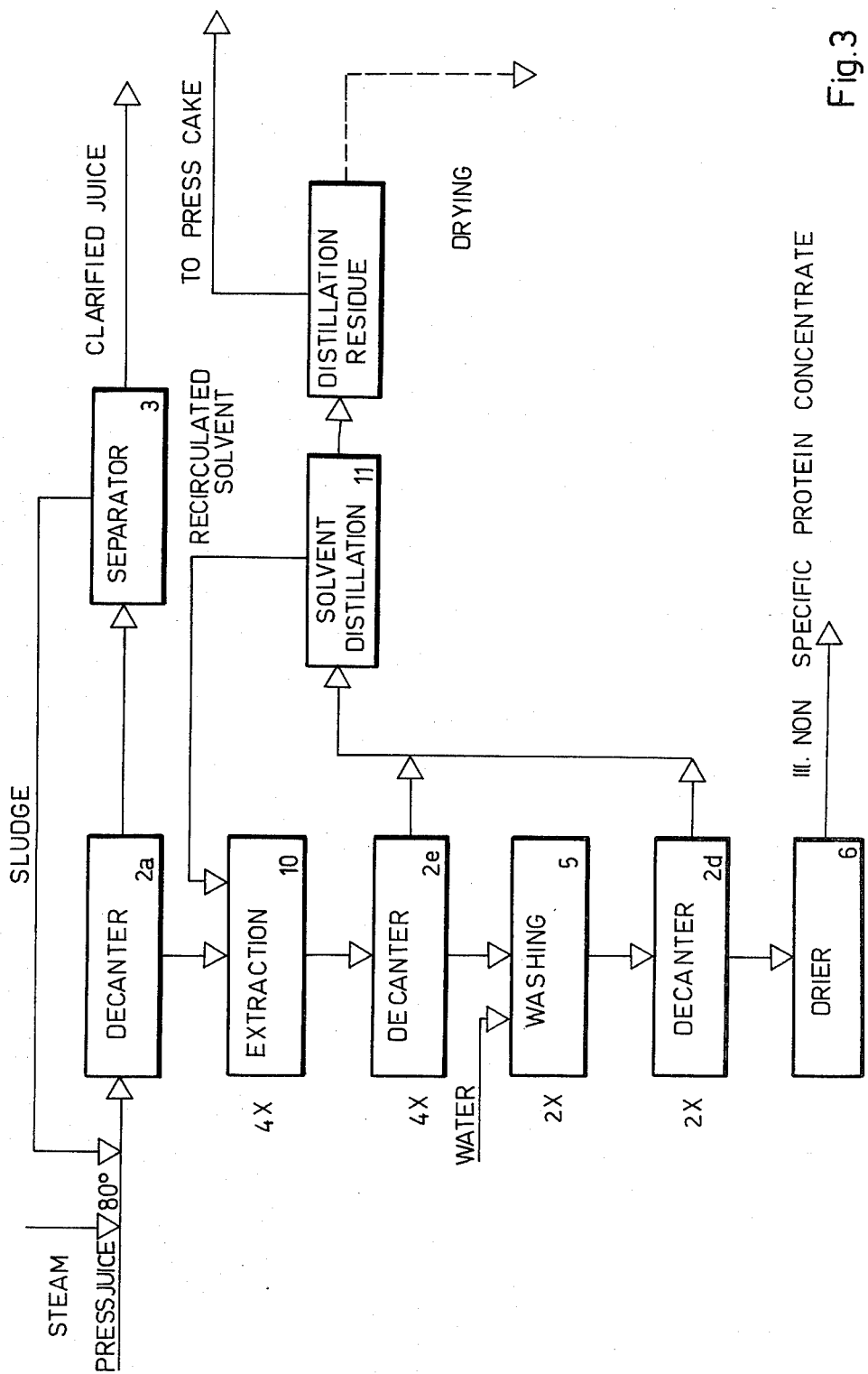

FIG. 3 illustrates the process of FIG. 2 with the difference that the distillation of the separated solvent fractions obtained in the decanters, in apparatus 11 is not subjected to a liquid-liquid extraction instead of the residue of the distillation is either dried in a separate step or it is mixed to the press cake obtained on processing the fibrous plant substance. In such case the press cake contains not only the ingredients present in the protein concentrate and dissolved by means of the apolar solvent but all accompanying substances removable with glycol ether, that is, the triterpens, steroidic saponine and phenolic compounds.

As a result of the processing method illustrated on FIGS. 1 and 2 obtained pigment concentrates, II, and IV can be dried. In necessary cases a hydrolysis with an alkali can be carried out before the drying step. The pigment concentrate can be isolated according to the invention in a fractionated form; that is, pigment concentrate I contains mainly xanthophyll and lipids, and pigment concentrate II contains mainly carotenes. The two kinds of pigment concentrate can be united in pigment concentrate IV. The significance of the fractionated pigment isolation is that the pigment concentrate can be selectively used as an additive in itself depending on the kind of animal to be foddered. Such a method was not possible according to the known methods.

EXAMPLE 1

1000 kg. of alfalfa (Medicago sativa) in green bud state with 18 weight % dry matter content and containing 4.9 weight % of crude protein is processed. After disintegration the obtained ground products are pressed twice, first under a pressure of amounting to 10 to 15 atm. thereafter under high pressure of about 50 to 100 atm. The united press juice weight 800 kg. with 10 weight % of dry matter content and 38 weight % of crude protein is pumped to a heat treating unit. Before heat treating 300 ppm. of a surface active substance (Krontramin 210) is added to the pressed juice. The heat treatment takes place at 80° C. by means of direct heat treatment. The thus heated juice is conducted continuously to the separation, the time of heat treatment is about 5 minutes. The separation is carried out in two apparati coupled in series, the first one being a decanter type self-triggering separator in which the major part of the protein precipitate (curd) coagulated under heat treatment is removed. The functioning of this decanter is adjusted to separate a green protein curd with a dry matter content of about 28 to 33 weight %. The clarified, but not entirely clear juice leaving the first decanter is conducted to the second separator unit, which is a disc separator, where the post-clarifying of the juice takes place. The dilute sludge separated in the second decanter, having a dry matter content of about 10 to 15% by weight, is recirculated to the first decanter, to the storage tank thereof. In the separator unit consisting of two separators therefore only two products are isolated, in the first decanter the green protein curd and the clarified juice in the second separator, which juice is concentrated in vacuo. The green protein curd amounting to 184 kg. is treated with 300 kg. of ethyleneglycol monoethylether and is stirred 1 hour. The suspension is separated from the treating fluid in a decanter and the previous operation is repeated with an identical amount of treating fluid. The first two extraction fluids are left separately standing until further processing. The treated sludge is thereafter treated still twice using 200 kg. of ethyleneglycol in each operation and the treating time is always 1 hour. The treated residue is suspended twice by using always 200 liter of water, the solid matter is separated and washed until it becomes free from solvent. The juice obtained from the washing with water is united with the solvent used in the second two treatment steps and it is stored until further processing. The protein curd now free from solvent is dried. The drying is carried out in a pneumatic dryer apparatus, entry temperature 220° C. and 105° C. exit temperature.

The extract juice obtained from the treatment of the protein curd in the first two steps, which contains water as well due to the water content of the decanter sludge, is extracted with a benzene having a boiling point range 80° to 100° C. The employed benzene quantity is about 20 times more than the amount of ethylene glycol water mixture. The benzene leaving the liquid-liquid extraction is continuously regenerated and recirculated into the extraction. The distillation residue containing a slight solvent excess is removed from the distillation apparatus and the solvent content thereof is eliminated in a vacuum drier apparatus at 50° C. and it is dried. The product isolated is green owing to its chlorophyll content and it is enriched in xanthophyll. The product may be used per se or after purification as a fodder additive. If the protein fraction is dried directly a product containing 2000 to 2500 mg. of beta-carotene and xanthophyll is obtained, in which the ratio of the two main pigments is about 30 to 40 percent of beta-carotene and 60 to 70% of xanthophyll whereas the isolated product according to the invention contains 30,000–40,000 mg./kg. of xanthophyll and only 5,000 to 10,000 mg./kg. of beta-carotene. The green protein curd is treated with ethylenglycol-monoethylether in a third and fourth step, as well and the extract liquids are extracted similarly as in the foregoing with benzene, isolating thus a product containing mainly beta-carotene and only in slighter amounts of xanthophyll. The latter product contains 15,000 to 20,000 mg./kg. of beta-carotene and 4,000 to 5,000 mg./kg. of xanthophyll.

According to the example the following products are prepared out of the starting material:

1. Non-specific protein fraction: 47.5 kg.
Composition:
water: 6.0%
crude protein(N×6.25): 70.0%
lipids: 0.5%
crude fibre: 1.5%
mineral substances: 4.0%
nitrogenfree extract: 18.0%.

The decomposition products of the chlorophyll cannot be traced in the product. Saponine content calculated on basis of the haemolytic index is less than 10 ppm.

2. Xanthophyll concentrate: 1.5 kg.
Composition:
water: 3.0%
xanthophyll: 3.1%
beta-carotene: 0.5%
lipids: ad 100%
This product is green due to its chlorophyll content and contains 1000 mg./kg. of Santoquine antioxidant.

3. Carotene concentrate: 2.5 kg.
Composition:
water: 3.0%
beta-carotene 0.8%
xanthophyll: 0.4%
lipids: ad 100%
The product has a green color and contains 1000 mg./kg. of Santoquine antioxidant.

EXAMPLE 2

According to the method of Example 1, 1000 kg. of alfa-alfa is processed. The treatment with ethyleneglycol monoethylether is carried out identically as in Example 1, the extracted juices, however, are not isolated but they are processed together with the washing liquids obtained at the solvent washing of the product. To the obtained 1400 kg. of aqueous ethyleneglycol monoethylether solution 10 g. of Santoquine emulsion is added and the solvent and water are distilled in vacuo to obtain 100 kg. of residue. The ratio of ethyleneglycol monoethylether to water is adjusted in the distillation residue to 70:30 and the extraction with benzene is carried out in accordance with Example 1. The benzene is thereafter distilled off and the residue is processed as described in Example 1. In this way the valuable carotenoid pigments are isolated together with the directly dried protein concentrate. The advantage of this kind of processing is that the concentration of the beta-carotene and xanthophyll can be substantially increased. After the extraction with benzene the aqueous ethyleneglycol monoethylether fraction is distilled, the solvent is removed and the major part of the water as well. The distillation residue amounting to 20 to 25 kg. contains 7 kg. of dry matter, this residue is intermingled with the fibrous fraction obtained in the course of pressing the green plant and before drying thereof. This method enables to reunite the lipids present in the plant material and precipitated together with the protein fraction after the isolation of the carotene to the fibrous fraction where it can be utilized on foddering of ruminants. The following products can be obtained as a result of the method described in this Example:

1. Non-specific protein concentrate.
The weight and composition is identical with that of Example 1.

2. Pigment concentrate: 4.5 kg.
Composition:
water 3.0%
beta-carotene 0.6%
xanthophyll 1.2%
lipids as 100%
The product is green owing to the presence of chlorophyll and contains 1000 mg./kg. xanthophyll antioxidant.

3. Dried fodder flour or granulate: 145 kg.
Composition:
water 12.0%
crude protein 12.0%
crude fibre 35.0%
mineral substances 12.0%
nitrogen free extract 27.0%
crude fat 2.0%
beta-carotene 30 mg./kg.
xanthophyll 50 mg./kg.

EXAMPLE 3

1000 kg. of Amaranthus sp. is processed before blossoming. The characteristic properties of this crude material is a dry matter content of 17.5 weight % and a crude protein content of 4.0%. Disintegration and pressing of the green plant further the isolation of the protein fraction is carried out in accordance with Example 1. The green protein curd obtained in the separator unit is treated according to Example 2. The following products can be obtained:

1. Non-specific protein concentrate: 37.5 kg.
Composition identical with that of Example 1.

2. Pigment concentrate: 4.0 kg.
Composition:
water 3.0%
beta-carotene 0.5%
xanthophyll 1.3%
lipids ad 100%
The product has a green color owing to the presence of chlorophyll and contains 1000 mg./kg. of xanthophyll.

What I claim is:
1. A process for preparing a plant protein concentrate which comprises
 (a) pressing a green plant material to provide a press cake and pressed juices;
 (b) precipitating a protein fraction by heating the pressed juices at about 80° C.;
 (c) extracting in a multi-step manner the protein fraction containing 1.5 to 2 times more water than its dry weight twice with at least 5 times more ethyleneglycolether or diethyleneglycolether than its dry weight;
 (d) drying the extracted protein fraction after washing it with water to obtain a protein concentrate;
 (e) distilling the aqueous ethyleneglycolether or ethylenediglycolether phase obtained from the above extraction, and
 (f) isolating a pigment concentrate containing lipids, chlorophyll, xanthophyll and carotenoids by mixing a residue from the distillation of step (e) with the press cake of step (a).

2. A process as claimed in claim 1, wherein in step (b) the solvent system employed consists of ethyleneglycolether or diethyleneglycolether and methanol in a ratio of 3:1 to 2:1.

3. A process for preparing a plant protein concentrate which comprises
(a) pressing a green plant material to provide a press cake and pressed juices;
(b) precipitating a protein fraction by heating the pressed juices at about 80° C.;
(c) extracting the coagulated protein fraction containing 1.5 to 2 times more water than its dry weight twice with at least 5 times more ethyleneglycolether or diethyleneglycolether than its dry weight;
(d) combining and extracting the ethylene or diethylene glycolether phases with an immisible second solvent and separating both layers;
(e) isolating a xanthophyll concentrate by distilling off the second solvent extract and drying the residue;
(f) repeating process steps (c), (d) and (e) to isolate a beta-carotene concentrate; and
(g) washing the extracted residue of step (f) with water and drying the product to obtain the protein concentrate.

4. A process as claimed in claim 1 or 3 wherein the precipitation of the protein fraction is aided by the additional use of a surface active agent or mixture thereof which have an HLB value in the range of 8 to 18.